US006467519B1

(12) United States Patent
Owen (10) Patent No.: US 6,467,519 B1
(45) Date of Patent: Oct. 22, 2002

(54) TREAD-LOCKING WHEEL (75) Inventor: Robb Owen, Albion, IN (US)

(73) Assignee: Unlimited Plastic Technologies, Inc., Columbia City, IN (US)

( * ) Notice: Subject to any disclaimer, the term of this patent is extended or adjusted under 35 U.S.C. 154(b) by 0 days.

(21) Appl. No.: 09/630,058

(22) Filed: Aug. 1, 2000

Related U.S. Application Data (60) Provisional application No. 60/146,910, filed on Aug. 3, 1999.

(51) Int. Cl.[7] .......................... B60C 25/00; B60C 7/00; B60C 5/16; B06B 5/02
(52) U.S. Cl. .................. 152/393; 152/323; 301/64.704
(58) Field of Search .............................. 152/17, 69, 75, 152/80, 323 I, 393, 394, 379.3, 379.4, 379.5; 301/64.701, 64.704, 5.306, 5.307, 43, 52; 404/121; 305/4

(56) References Cited

U.S. PATENT DOCUMENTS

| | | | | |
|---|---|---|---|---|
| 583,865 A | * | 6/1897 | Cowen | 152/379.3 |
| 793,139 A | * | 6/1905 | Maguire | 152/323 |
| 1,123,351 A | * | 1/1915 | Nebergall | 301/52 |
| 1,203,458 A | * | 10/1916 | Barnes | 152/251 |
| 1,213,834 A | * | 1/1917 | Bunzlau et al. | 152/42 |
| 1,576,924 A | | 3/1926 | Malloy | |
| 1,865,432 A | | 7/1932 | Bossert | |
| 2,233,562 A | * | 3/1941 | Tannewitz | 152/323 |
| 2,701,971 A | * | 2/1955 | Carter et al. | 152/69 |
| 3,630,257 A | * | 12/1971 | Goldberger | 152/323 |
| 3,642,048 A | | 2/1972 | Poweleit | |
| 4,151,870 A | * | 5/1979 | Watts | 152/375 |
| 4,170,384 A | | 10/1979 | Rotheiser | |
| 4,184,531 A | * | 1/1980 | Honigsbaum | 152/379.3 |
| 4,208,073 A | | 6/1980 | Hechinger | |
| 4,218,098 A | * | 8/1980 | Burton | 152/323 |
| 4,275,524 A | | 6/1981 | Gabriel | |
| 4,387,070 A | | 6/1983 | Cunard et al. | |
| 4,447,093 A | | 5/1984 | Cunard et al. | |
| 4,572,265 A | * | 2/1986 | Lescoffit | 152/379.3 |
| 4,592,595 A | | 6/1986 | Freeman | |
| 4,900,095 A | | 2/1990 | Brubaker | |
| 4,923,252 A | | 5/1990 | Plamper et al. | |
| 5,660,447 A | | 8/1997 | Angelici | |
| 6,099,091 A | * | 8/2000 | Campbell | 152/209.17 |
| 6,279,630 B1 | * | 8/2001 | Herbert Ims | 152/84 |
| 6,286,572 B1 | * | 9/2001 | Chen | 152/84 |

\* cited by examiner

Primary Examiner—S. Joseph Morano
Assistant Examiner—Jason R. Bellinger
(74) Attorney, Agent, or Firm—Randall J. Knuth (57) ABSTRACT

A wheel system for securely mounting a tire thereon. The assembly includes a wheel having a rim with radially outward extending slots. A tire with radially inward extending protuberances mates with the radially extending members for securely mounting the tire to the wheel. The mating of protuberances with the members limits radial deflection and rotational movement of the tire about the rim. Axial movement of the tire relative to the rim is limited by the inner surface of the sidewall of the tire abutting the ends of the radially extending slots. In one embodiment, the wheel is composed of material having elastic properties for absorbing shock.

56 Claims, 5 Drawing Sheets

TREAD-LOCKING WHEEL

This application claims the benefit of No. 60/146,910 filed Aug. 3, 1999.

BACKGROUND OF THE INVENTION

1. Field of the Invention

The present invention relates to a wheel and tire mounting system, and in particular, a wheel and tire mounting system which securely mounts a tire to a wheel.

2. Description of the Related Art

Wheels that traditionally have been used on garden equipment and children's toys consist of a tire mounted on a rim of a hub. Typically, the tire is produced of an elastic material such as rubber. The hub is normally produced of a rigid material such as plastic or metal. The hub may be a solid disk or may be composed of spokes radiating from a central hub to the rim. The tire is then mounted onto the rim.

One disadvantage in the art of garden and toy wheel construction is that the tire is normally only form-fit to the rim. As a result, the tire may experience radial movement or axial movement relative to the rim. In addition, the tire may experience rotational movement about the rim. Traditional wheels normally fail to provide means for limiting radial, axial or rotational movement of a tire relative to the rim.

Alternatively, a wheel may consist of a tireless wheel. In a tireless wheel system, the rim incorporates a tread material into it. In such an assembly, there is no additional tire mounted to the rim, as the rim itself replaces the necessity to have a separate tire with tread. Typically in a tireless wheel system, the tread material is produced of the same material as the hub and rim. The material normally is a plastic such as polyethylene or PVC.

A disadvantage of the tireless wheel system is the inability to replace the tread material (i.e. the surface contacting the ground) as the tread material is incorporated into the wheel/hub itself.

A second disadvantage of the tireless wheel is a less shock-absorbing wheel system when compared with a rubberized or elastic tire mounted to a wheel. The rubberized tire tends to absorb shock better than a solid tread surface composed of rigid plastic.

A third type of wheel used typically on toys such as in-line skates and skateboards, is a wheel having a hub composed of a first, rigid plastic and a tire formed of a second, more elastic material. The elastic material is permanently molded to the wheel. This system is manufactured by the process of melting the second plastic material and, pouring the melted plastic into a mold which comprises the hub. When the second material cures, a unified wheel and tire assembly is formed. A disadvantage of this system is that the tire cannot be replaced when the tread surface is worn. Since the tire is permanently incorporated into the wheel, one is not able to replace the tire without replacing both the wheel and tire.

One disadvantage of most wheels in the art is the lack of shock-absorbing features. Traditional wheels fail to include means for absorbing force applied to the wheel. Therefore, shocks and other forces applied to the wheel assembly are transferred through the wheel to the apparatus on which the wheel is mounted.

What is needed in the art is a wheel system which limits radial, axial and rotational movement of a tire relative to the rim upon which the tire is mounted. In addition, what is needed is the ability to replace the tire as the tire becomes worn.

What is also needed in the art is a wheel system which incorporates shock-absorbing means.

SUMMARY OF THE INVENTION

The present invention is a wheel system for securely mounting a tire to the rim of a hub. The wheel system limits radial deflection and axial movement of the tire relative to the rim. In addition, the present invention limits rotational movement of the tire about the rim. The wheel system includes a rim with radially extending slots which mate with complementary radially extending protuberances of a tire whereby securely mounting the tire to the rim.

The invention, in one form thereof, is a wheel for mounting a tire. The tire has a first and second inner sidewall surface, a tread surface, and a rim surface. A plurality of "T"-shaped protuberances extend radially from the rim surface. A sidewall width is defined between the first and second inner sidewall surfaces. The wheel includes a rim which has a mounting surface. A plurality of a pair of alternately "L"-shaped and inverse "L"-shaped members extend in a radial direction from the mounting surface and extend in an axial direction a distance no greater than the sidewall width. A slot is defined by the pair of alternately "L"-shaped and inversely "L"-shaped members. The slot is adaptedly dimensioned for slidingly receiving the "T"-shaped protuberances. The slot has a first and second slot end. In one further embodiment, a plurality of spokes radially extend between the rim and a hub. The spokes are formed of a material having elastic properties which absorb shocks. In an alternate embodiment, the first and second slot ends abut the first and second inner sidewall surfaces, respectively.

The invention, in another form thereof, is a wheel for mounting a tire having a first and second inner sidewall surface, a tread surface and a rim surface. From the rim surface, a plurality of "T"-shaped protuberances extend radially. A sidewall width is defined between the first and second inner sidewall surfaces. The wheel includes an inner rim and an outer rim. The outer rim is rotationally disposed about the inner rim. The outer rim has a mounting surface. A plurality of outer spokes extend radially from and attach the inner rim to the outer rim. The plurality of a pair of alternately "L"-shaped and inversely "L"-shaped members extend in a radial direction from the mounting surface and extend in an axial direction a distance no greater than the sidewall width. A slot is defined by the pair of alternately "L"-shaped members and inverse "L"-shaped members. The slot is adaptedly dimensioned for slidingly receiving the "T"-shaped protuberances. The slot has a first and second slot end. In one further embodiment, the plurality of outer spokes are formed of a material having elastic properties which absorb shock.

The invention, in yet another form thereof, is a tire mounting system. The system includes a tire having a first and second inner sidewall surface, a tread surface and a rim surface. A sidewall width is defined by a distance between the first and second inner sidewall surfaces. A plurality of "T"-shaped protuberances extend radially from the rim surface of the tire. The tire mounting system further includes a rim which has a mounting surface. A plurality of a pair of alternately "L"-shaped and inverse "L"-shaped members extend in a radial direction from the mounting surface of the rim and extend in an axial direction a distance no greater than the sidewall width. A slot is defined by the pair of alternately "L"-shaped members and inverse "L"-shaped members. The slot is adaptedly dimensioned for slidingly receiving the "T"-shaped protuberances. The slot has a first and second end. The tire is mounted to the rim such that the "T"-shaped protuberances mate in said slots. In one further embodiment, a plurality of spokes extend radially from and attach a hub to the rim. In a further, specific embodiment, the spokes are formed of material having elastic properties which absorb shock.

The present invention, in yet another embodiment thereof, is a tire mounting system. The tire mounting system includes a tire having a first and second inner sidewall surface, a tread surface and a rim surface. A sidewall width is defined between the first and second inner sidewall surfaces. A plurality of "T"-shaped protuberances extend radially from the rim surface of the tire. The tire mounting system also includes an inner rim and an outer rim. The outer rim is rotationally disposed about the inner rim. The outer rim has a mounting surface. The plurality of outer spokes radially extend from and attach the inner rim to the outer rim. A plurality of a pair of alternately "L"-shaped and inverse "L"-shaped members extend in a radial direction from the mounting surface and extend in an axial direction a distance no greater than the sidewall width. A slot is defined by the pair of alternately "L"-shaped members and inverse "L"-shaped members. The slot is adaptedly dimensioned for receiving the "T"-shaped protuberances and has a first and second slot end. The tire is mounted to the outer rim such that the "T"-shaped protuberance mates in the slots. In a further embodiment, the plurality of outer spokes are formed of a material having elastic properties which absorb shock.

The invention, in an another form thereof, is a wheel for mounting a tire. The wheel has a first and second inner sidewall surface, a tread surface and a rim surface from which a plurality of protuberances radially extend. A sidewall width is defined between the first and second inner sidewall surfaces. The wheel includes a rim having a mounting surface. A plurality of members extend in a radial direction from the mounting surface. Each member has an annular width. The members have a first and second end. The members form an attachment means complementarily dimensioned to the protuberances. The attachment means have an attachment means annular width. The member annular width is no greater than the attachment means annular width. In one further embodiment, the attachment means is a slot.

The invention, in another form thereof, is a tire mounting system. This system includes a tire with a first and second inner sidewall surface, a tread surface, and a rim surface. A sidewall width is defined between the first and second inner sidewall surfaces. A plurality of protuberances extend radially from the rim surface of the tire. A rim with a mounting surface includes a plurality of members extending in a radial direction from that mounting surface. Each member has an annular width. The members have a first and second end. The members form an attachment means complementarily dimensioned to the protuberances. The attachment means have an attachment means width. The member annular width is no greater than the attachment means annular width. The tire is mounted to the rim such that the protuberances mate with the attachment means. In one further embodiment, the attachment means is a slot.

One advantage of the present invention is a wheel system in which a tire is mounted to the rim of a wheel which limits radial, axial and rotational movement of the tire relative to the wheel. The tire includes radially inward (i.e. towards the rim) extending protuberances which are complementary to and mate with the slots that radially extend from the mounting surface of the rim. When the tire is mounted to the rim, the engagement of the protuberances in the slots limits the tire's radial deflection from the rim and rotational movement of the tire about the rim. Axial movement of the tire relative to the rim is achieved through the tire's inner sidewall surfaces abutting the ends of the radially extending slots such that axial movement of the tire relative to the rim is retarded.

A second advantage of one embodiment of the present invention is a wheel system which incorporates shock absorbing means. In one particular embodiment, the wheel includes shock absorbing means consisting of radially extending spokes composed of a material such as polyethylene which is capable of absorbing shocks applied to the wheel. In an alternate embodiment, a plurality of outer spokes composed of elastic material span between an inner rim and an outer rim whereby effectuating shock-absorbing capabilities.

An additional advantage of the present invention is the ability to securely mount a tire to a wheel which may be subject to radial deflection. In one form of the present invention, a plurality of spokes are made of elastic plastic material which absorbs shocks. In absorbing shocks, the rim is subjected to radial deflection. In order to limit a tire's radial deflection from the rim during shock-absorbing deflection, the present invention securely mounts the tire to the rim through the use of radially inward (relative to the rim) extending protuberances from the tire's rim surface which complement radially outwardly (relative to the rim) extending slots from the rim. As a result of the mating of the protuberances with the slots, the tire remains securely mounted to the rim whereby the tire resists radial deflection from the rim.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiments of the invention, and such exemplification is not to be construed as limiting the scope of the invention in any manner.

DETAILED DESCRIPTION OF THE INVENTION

Figure 1:
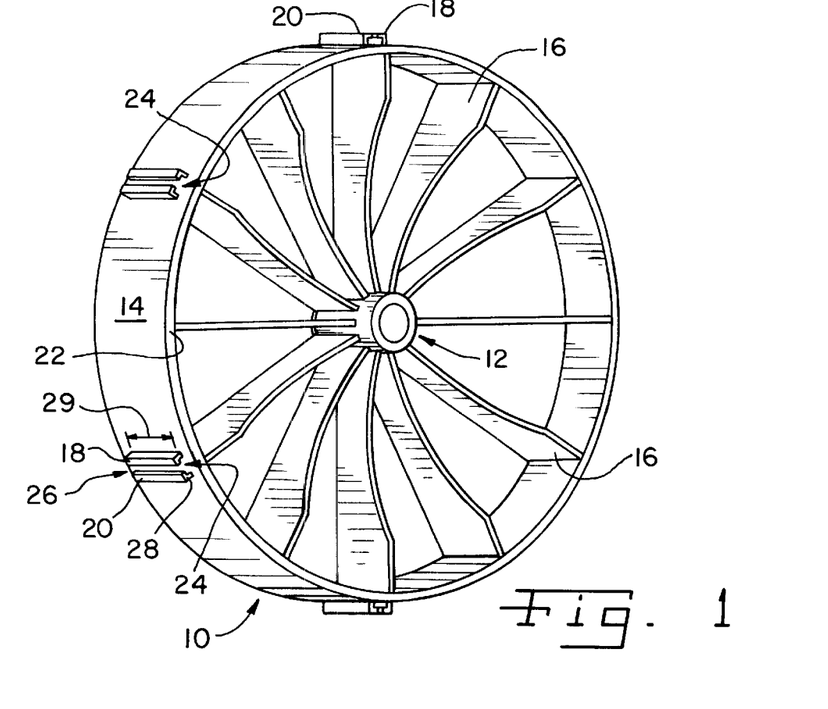
FIG. 1 is a front perspective view of a wheel with hub and rim according to one embodiment of the present invention.

Referring now to the drawings and particularly to FIG. 1, there is shown wheel 10 which comprises hub 12, rim 14 and a plurality of spokes 16. Spokes 16 extend radially from hub 12 and attach to rim 14, whereby forming a wheel assembly for mounting a tire. The wheel assembly may be composed of polyvinyl chloride (PVC). In the preferred embodiment, hub 12, rim 14 and spokes 16 are composed of polyethylene. However, wheel 10 may be composed of other suitable material which functions to provide a suitable wheel system for mounting a tire.

In one embodiment of the invention, spokes 16 are produced of polyethylene or suitable material having elastic properties. The elastic properties permit wheel 10 to absorb shocks. For example, if wheel 10 is mounted on a lawn mower, wheel 10 is subject to shock from the surface upon which wheel 10 rolls. Shock may be applied to wheel 10 as wheel 10 rolls along the surface. The elastic properties of spokes 16 help to absorb shocks applied to the wheel rather than transferring the shock to the apparatus (i.e. the lawn mower) to which wheel 10 is attached. The effect of the incorporated shock absorbing properties results in both wheel 10 and the apparatus to which wheel 10 is mounted to have a smoother ride.

A plurality of a pair of members 18, 20 extend radially from mounting surface 22 of rim 14. In one embodiment, members 18, 20 are "L"-shaped and inverse "L"-shaped respectively. In a preferred embodiment, radially extending "L"-shaped and inverse "L"-shaped members 18, 20 extend substantially normal from mounting surface 22. Member 18, 20 form attachment means for securing a tire to rim 14. In the embodiment depicted in FIG. 1, the pair of "L"-shaped and inverse "L"-shaped members 18, 20 form an attachment means in the form of slot 24.

Slots 24 are disposed about mounting surface 22. Preferably, slots 24 are evenly spaced apart from one another. Slots 24 extend in an axial direction a distance 29. Distance 29 is no greater than the inner width (as measured between the two inner sidewall surfaces) of a tire mounted to wheel 10. Slots 24 are used for securing a tire to wheel 10.

Slots 24 have a first slot end 26 and a second slot end 28. In a preferred embodiment, when a tire is mounted to wheel 10, first and second slot ends 26, 28 abut the respective inner surfaces of a tire's sidewalls.

Figure 2:
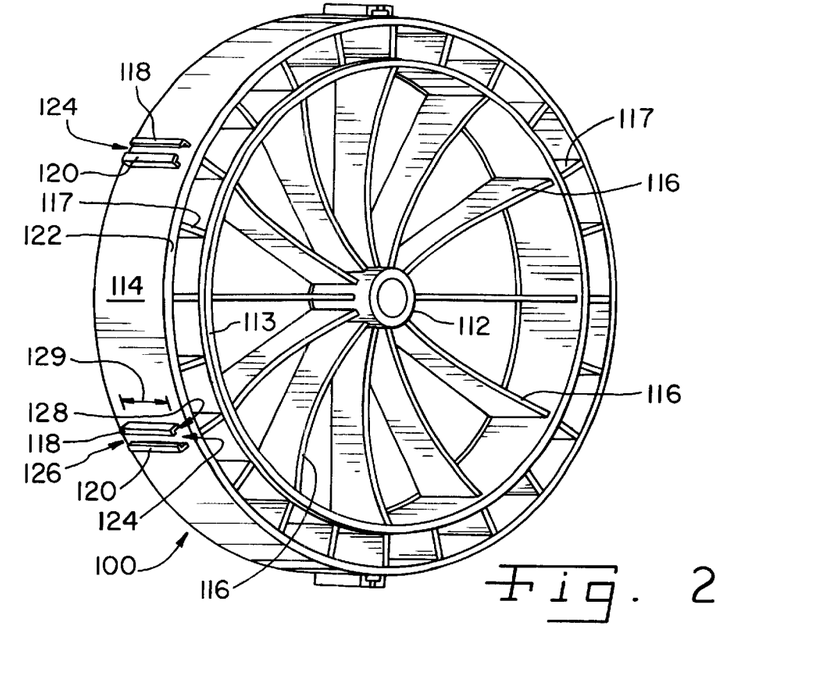
FIG. 2 is a front elevational view of another embodiment of a wheel according to the present invention, incorporating a hub with an inner and an outer rim.

Referring now to FIG. 2, wheel 100 depicts an alternate embodiment of a wheel system for mounting a tire. Wheel 100 comprises hub 112, inner rim 113 and outer rim 114. A plurality of radially extending spokes are affixed to hub 112 and extend radially to inner rim 113. The plurality of inner spokes 116 rigidly attach inner rim 113 to hub 112. A plurality of outer spokes 117 rigidly attach outer rim 114 to inner rim 113.

Wheel 100 may be composed of any suitable plastic material, which includes PVC and polyethylene. In a preferred embodiment, outer radial spokes 117 are composed of polyethylene or similar plastic having elastic properties. The elastic properties permit wheel 100 to absorb shock when a shock is applied to wheel 100.

Attachment means in the form of slots 124 are composed of alternate "L"-shaped and inverse "L"-shaped members 118 and 120, respectively extending in a radial direction from mounting surface 122. In a preferred embodiment, "L"-shaped members extend substantially normal to mounting surface 122. Slots 124 are used to secure a tire to wheel 100. Slots 124 have a first and second slot end 126, 128 and extend in an axial direction a distance 129 no greater than the inner width (as measured between two inner sidewall surfaces) of a tire mounted to wheel 100. In a preferred embodiment, when a tire is mounted to wheel 100, first and second slot ends 126, 128 abut the respective inner surface at a tire's sidewalls.

Figure 3A:
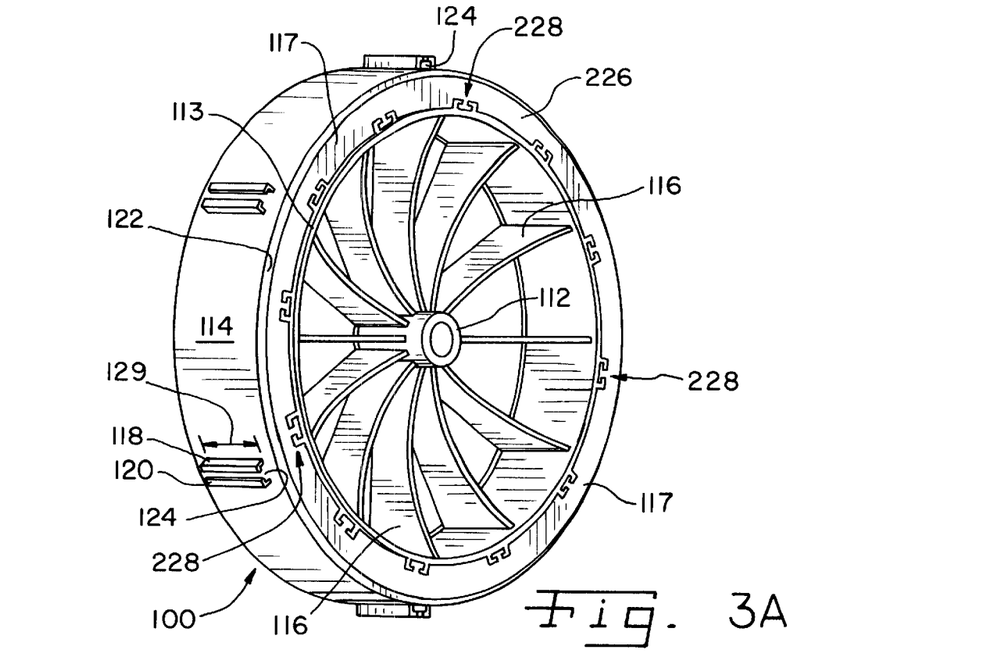
FIG. 3(a) is a front elevational view of a wheel assembly with a hub, inner and outer rims and a hub cap.
Figure 3B:
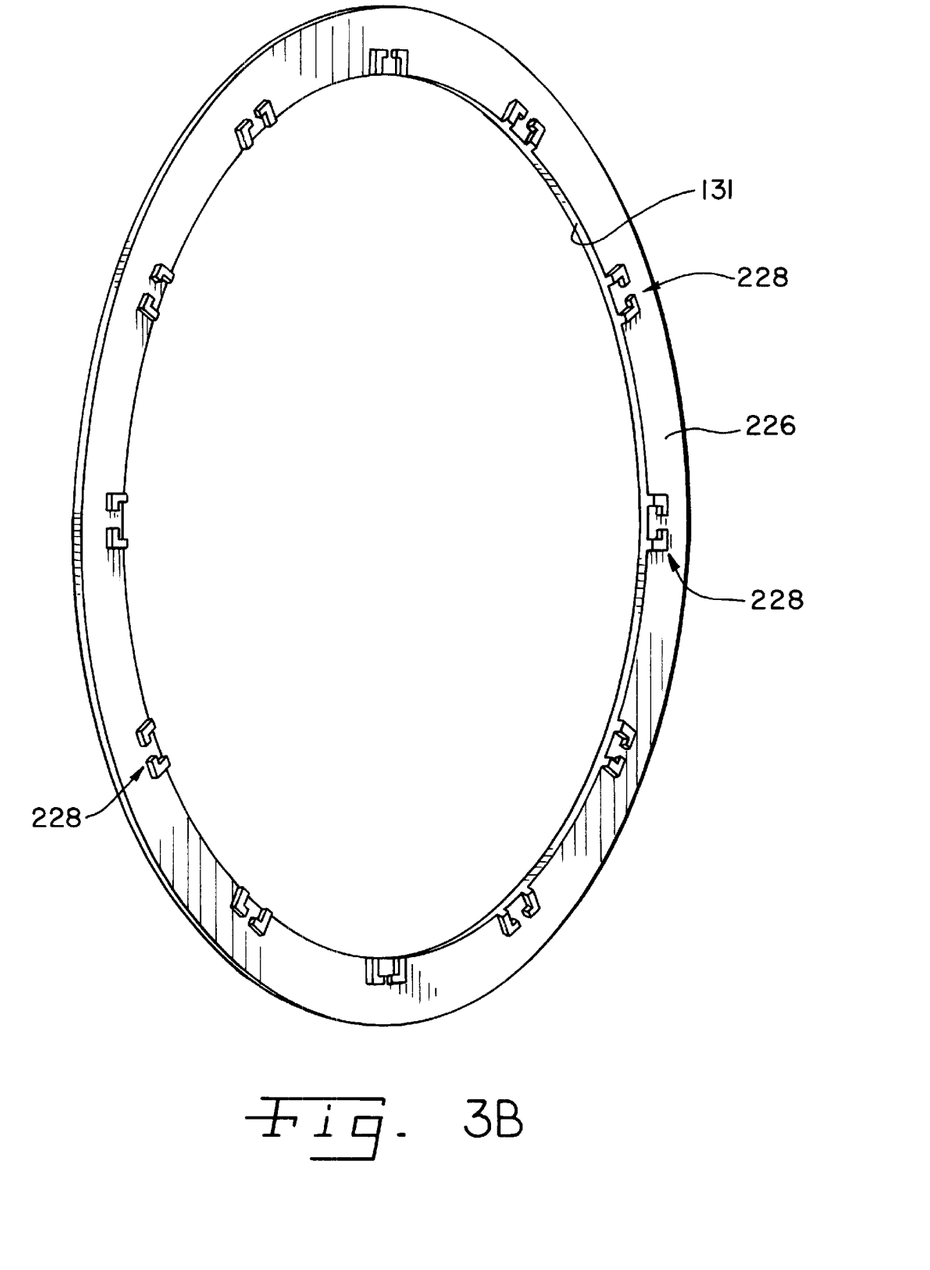
FIG. 3(b) is the hub cap of FIG. 3(a)

Referring now to FIGS. 3(a) and 3(b). A hub cap 226 having inner surface 131 clips onto wheel 100 and rotationally spans the distance between inner rim 113 and outer rim 114. Hub cap 226 includes a plurality of axially extending clips 228 which extend axially (relative to wheel 100) from the inner surface 131. When hub cap 226 is mounted onto wheel 100, clips 228 engage and mate with the plurality of outer spokes 117 (see FIG. 2), thereby securing hub cap 226 to wheel 100. The attachment means is a form-fit and frictional connection between clips 228 and outer spokes 117, and between hub cap 226 and inner and outer rims 113, 114.

Figure 4:
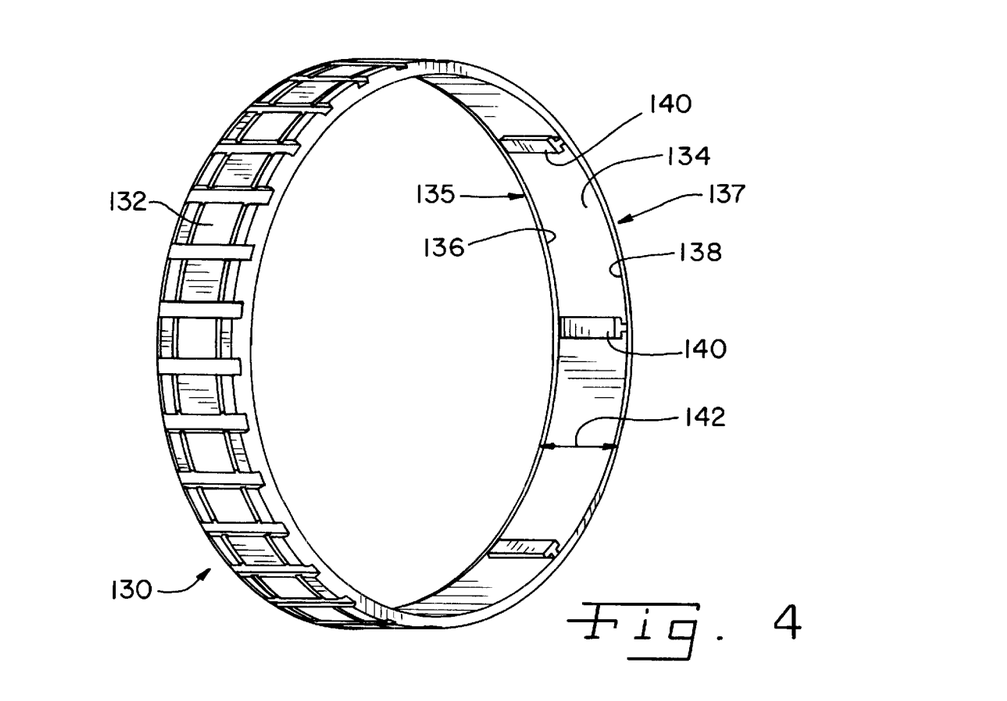
FIG. 4 is a tire for mounting on the wheel assembly according to the present invention.
Figure 5:
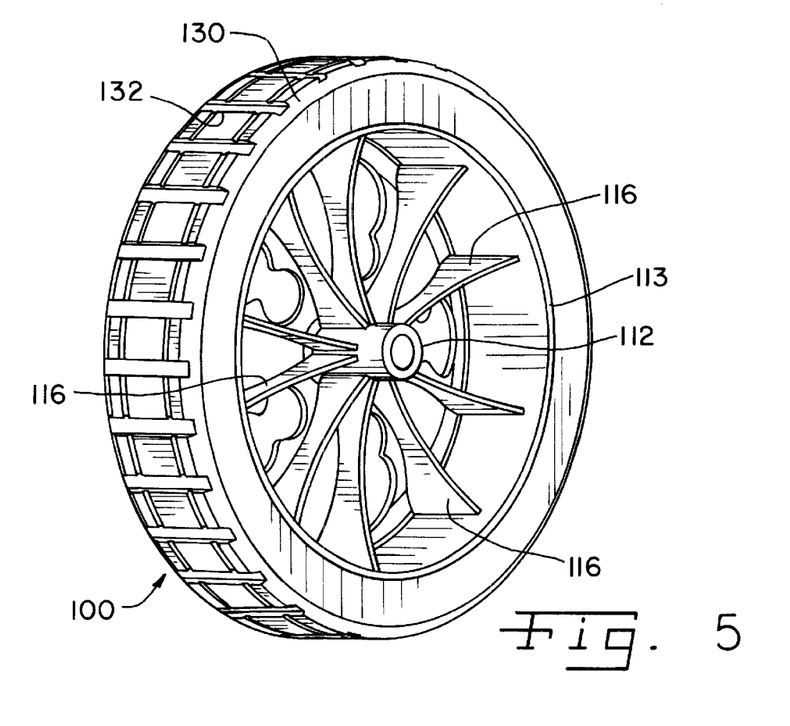
FIG. 5 is a front elevational view of a wheel system with tire mounted to a wheel according to the present invention.

FIGS. 4 and 5 are illustrative examples of the mounting of a tire to the wheel system. While FIGS. 4 and 5 use the embodiment depicted in FIGS. 2 and 3(a), the mounting of the tire is the same for the embodiment depicted in FIG. 1.

Referring now to FIGS. 4 and 5, tire 130 mounts on wheel 100. Tire 130 has tread surface 132 and rim surface 134. Tire 130 has side walls 135, 137 having a first and second inner sidewall surfaces 136, 138 respectively. A plurality of protuberances 140 extend radially from rim surface 134. Protuberances 140 are adaptively dimensioned and complementarily shaped to mate with the attachment means. Since the present embodiment has attachment means in the form of slots 124 (FIG. 2), protuberances 140 are "T"-shaped in order to properly mate with slot 124 of wheel 100.

A sidewall width 142 is defined by the space between first and second inner sidewall surfaces 136, 138. Sidewall width 142 is preferably equal to an axial distance 129 which "L"-shaped and inverse "L"-shaped members 118, 120 extend (FIG. 3).

Figure 6:
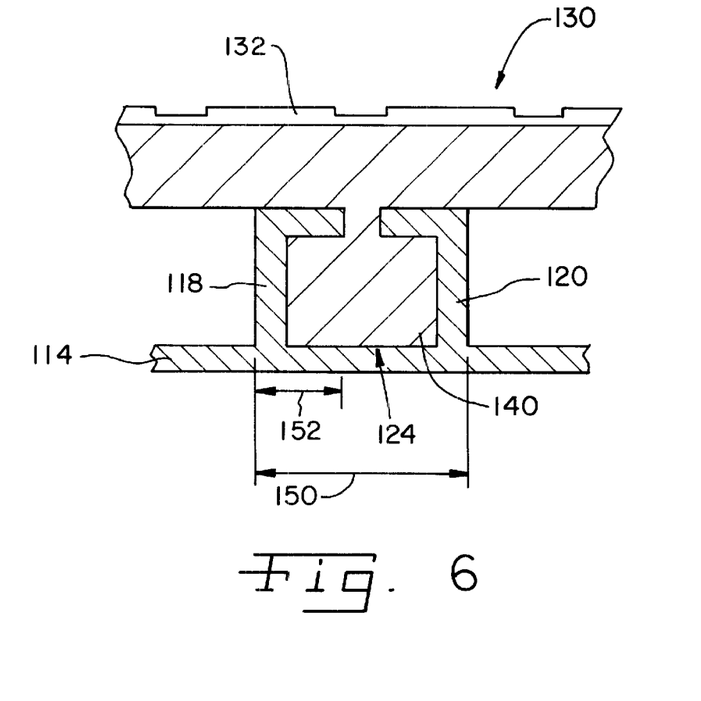
FIG. 6 is an axial cross sectional view through a rim and tire.

Referring now to FIG. 6, there is shown an axial cross-sectional view through the rim 114 and tire 130 of FIG. 5. "T"-shaped protuberance 140 mates with and is secured in slot 124 formed by "L"-shaped members 118 and inverse "L"-shaped member 120.

FIG. 6 shows one embodiment of an attachment means for mating with a tire's extending protuberances 140. The attachment means in FIG. 6 is depicted as a slot 124. Slot 124 is formed from two radially extending members, "L"-shaped and inverse "L"-shaped members 118, 120. Attachment means, slot 124, has an attachment means annular width 150. Annular width 150 is measured as the distance between members 118 and 120. Each radially extending member, "L"-shaped and inverse "L"-shaped member 118, 120 has a member annular width 152. IN a preferred embodiment, member annular width 152 is no greater than attachment means annular width 150.

Figure 7:
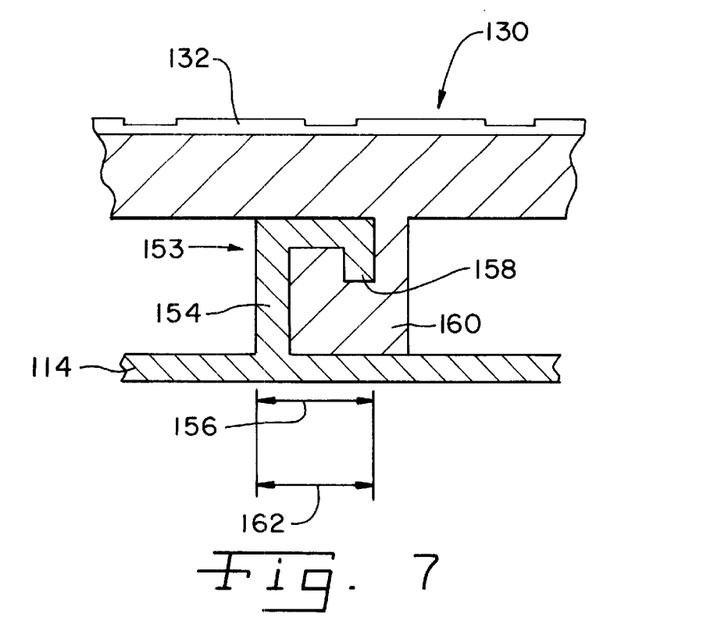
FIG. 7 is an axial cross sectional view through a rim and tire.

FIG. 7 depicts an alternate embodiment of an attachment means. The attachment means 153 of FIG. 7 is depicted as a single, radially extending member 154 having a member annular width 156. Member 154 includes a hook portion 158. A radially extending protuberance 160 complementary to member 154 extends from tire 130. Attachment means 153 mates with and secures tire 130 to rim 114 via the indicated interfit mating of member 154 with protuberance 160. Attachment means 153 has an attachment means annular width 162. Attachment means annular width 162 is, in this embodiment, equal to the member annular width 156. A single member 154 forms the attachment means 153, such that a single member 154 mates with protuberance 160.

Figure 8:
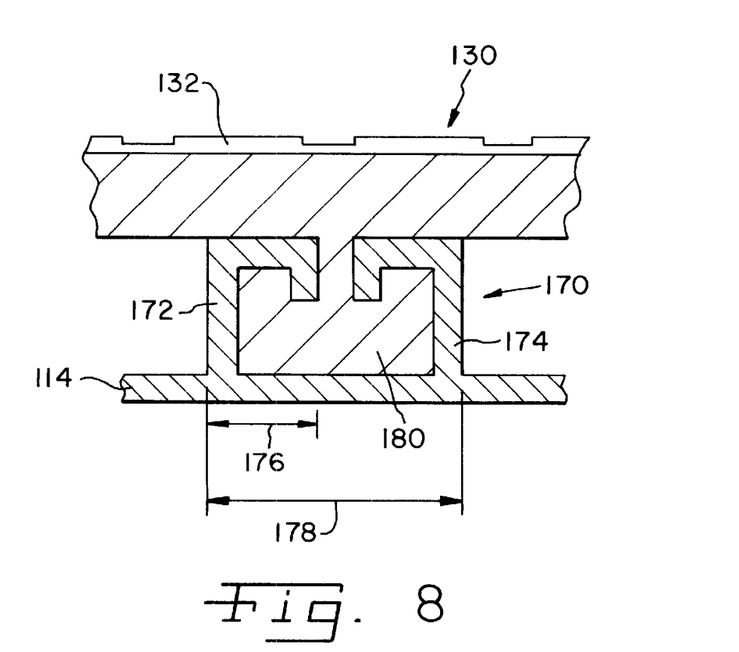
FIG. 8 is an axial cross sectional view through a rim and tire.

Referring now to FIG. 8, attachment means 170 comprises members 172, 174. Each member has a member annular width 176. Attachment means 170 has an attachment means annular width 178. In a preferred embodiment, member annular width 176 is no greater than attachment means annular width 178. Attachment means 170 is dimensioned to mate with protuberance 180, which extends radially from tire 130.

FIGS. 6–8 depict various attachment means for attaching a tire to a rim. However, other attachment means may be utilized which mate with and secure a tire to the rim. While the cross-section of the attachment means and protuberances have corners with only right angles, the corners could have different angles. For example, the cross-section could be "star" shaped.

During the mounting of tire 130 to wheel 100, "T"-shaped protuberances 140 slide into slots 124 (FIG. 2). In a preferred embodiment, width 142 permits first and second inner surfaces 136, 138 to abut and cover first and second slot ends 126, 128. Axial movement of tire 130 along mounting surface 122 of rim 114 is restricted since member pairs 118, 120 are entrapped between inner sidewall surfaces 136, 138. In a most preferred embodiment, width 142 is substantially equal to axial distance 129 (i.e. the axial length of slot 124).

Slots 124 are preferably evenly spaced along mounting surface 122. The "T"-shaped protuberances 140 are complementarily spaced. As a result, mounting of tire 130 to rim 114 is simplified as all slots 124 and all protuberances 140 will align simultaneously.

Radial deflection of tire 130 from wheel 100 is limited by the interlocking connection of radially extending "T"-shaped protuberances 140 of tire 130 into slots 124. Once the "T"-shaped protuberances 140 are slid into slots 124, radial deflection of tire 130 from mounting surface 122 is limited.

Preventing radial deflection is especially advantageous in one embodiment in which the wheel system includes shock absorbing characteristics in the form of radially extending members composed of elastic material. The use of such elastic material in the radially extending members may result in wheel deflection in a radial direction when shock is applied to the wheel. A possible result of wheel deflection is radial movement of the tire from the rim. Consequently, it is advantageous to have a means by which a tire is securely fastened to the rim to prevent or limit radial deflection of the tire from the rim. The use of radially extending slots which mate with radially extending protuberances from the inner surface of a tire limits radial deflection of the tire from the rim.

In addition, rotational movement of tire 130 about outer rim 114 is limited due to the interfitting of "T"-shaped protuberances 140 with slots 124. Axial movement of tire 130 relative to rim 114 is limited by the inner tire sidewall surfaces abutting and entrapping the axially extending protuberances.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An assembly comprising a tire in mounting relationship to a wheel, said tire having a first and second inner sidewall surface, a tread surface, a rim surface, a plurality of "T"-shaped protuberances radially extending from said rim surface, and a sidewall width defined between the first and second inner sidewall surfaces; said wheel comprising:

a rim having a mounting surface;

a plurality of a pair of alternately "L"-shaped and inverse "L"-shaped members extending in a radial direction from said mounting surface, and extending in an axial direction a distance no greater than the sidewall width of said tire; and a respective slot defined by each said pair of alternately "L"-shaped members and inverse "L"-shaped members, each said slot adaptedly dimensioned for slidingly receiving a respective one of said plurality of "T"-shaped protuberances of said tire and having a respective first and second slot ends.

2. The assembly of claim 1 wherein said "L"-shaped and inverse "L"-shaped members extend substantially normal to said rim.

3. The assembly of claim 1 wherein the distance each said pair of alternately "L"-shaped and inverse "L"-shaped members extend axially is substantially equal to the sidewall width of said tire such that said respective first and second slot ends thereof abut the first and second inner sidewall surfaces of said tire, respectively.

4. The assembly of claim 1, wherein said wheel further comprising:

a hub encircled by said rim; and a plurality of spokes radially extending from and attaching said hub to said rim.

5. The assembly of claim 4 wherein said plurality of spokes are formed of material having elastic properties which absorbs shock.

6. The assembly of claim 5 wherein said material is polyethylene.

7. An assembly comprising a tire in mounting relationship to a wheel, said tire having a first and second inner sidewall surface, a tread surface, a rim surface, a plurality of "T"-shaped protuberances radially extending from said rim surface, and a sidewall width defined between the first and second inner sidewall surfaces; said wheel comprising:

an outer rim and an inner rim, said outer rim rotationally disposed about said inner rim, said outer rim having a mounting surface;

a plurality of outer spokes radially extending from and attaching said inner rim to said outer rim;

a plurality of a pair of alternately "L"-shaped and inverse "L"-shaped members extending in a radial direction from said mounting surface, and extending in an axial direction a distance no greater than the sidewall width of said tire; and a respective slot defined by each said pair of alternately "L"-shaped members and inverse "L"-shaped members, each said slot adaptedly dimensioned for slidingly receiving a respective one of said plurality of "T"-shaped protuberances of said tire and having a respective first and second slot ends.

8. The assembly of claim 7 wherein said "L"-shaped and inverse "L"-shaped members extend substantially normal to said outer rim.

9. The assembly of claim 7 wherein the distance each said pair of alternately "L"-shaped and inverse "L"-shaped members extend axially is substantially equal to the sidewall width of said tire such that said respective first and second slot ends thereof abut the first and second inner sidewall surfaces of said tire, respectively.

10. The assembly of claim 7, wherein said wheel further comprising:

a hub encircled by said inner rim; and a plurality of inner spokes radially extending from and attaching said hub to said inner rim.

11. The assembly of claim 7 wherein said plurality of outer spokes are formed of material having elastic properties which absorbs shock.

12. The assembly of claim 11 wherein said material is polyethylene.

13. A tire mounting system, the system comprising:

a tire having a first and second inner sidewall surface, a tread surface, and a rim surface;

a sidewall width defined between said first and second inner sidewall surfaces;

a plurality of "T"-shaped protuberances extending radially from said rim surface of said tire;

a rim having a mounting surface;

a plurality of a pair of alternately "L"-shaped and inverse "L"-shaped members extending in a radial direction from said mounting surface, and extending in an axial direction a distance no greater than said sidewall width;

a slot defined by said pair of alternately "L"-shaped members and inverse "L"-shaped members, said slot adaptedly dimensioned for slidingly receiving said "T"-shaped protuberances and having a first and second slot ends; and said tire mounted to said rim such that said "T"-shaped protuberances mate in said slots.

14. The tire mounting system of claim 13 wherein said "L"-shaped and inverse "L"-shaped members extend substantially normal to said rim.

15. The tire mounting system of claim 13 wherein said distance said pair of alternately "L"-shaped and inverse "L"-shaped members extend axially is substantially equal to said sidewall width such that said first and second slot ends abut said first and second inner sidewall surfaces.

16. The tire mounting system of claim 13, further comprising:

a hub encircled by said rim; and a plurality of spokes radially extending from and attaching said hub to said rim.

17. The tire mounting system of claim 15 wherein said plurality of spokes are formed of material having elastic properties which absorbs shock.

18. The tire mounting system of claim 17 wherein said material is polyethylene.

19. A tire mounting system, the system comprising:

a tire having a first and second inner sidewall surface, a tread surface, and a rim surface;

a sidewall width defined between said first and second inner sidewall surfaces;

a plurality of "T"-shaped protuberances extending radially from said rim surface of said tire;

an inner rim and an outer rim, said outer rim having a mounting surface;

a plurality of outer spokes radially extending from and attaching said inner rim to said outer rim;

a plurality of a pair of alternately "L"-shaped and inverse "L"-shaped members extending in a radial direction from said mounting surface, and extending in an axial direction a distance no greater than the sidewall width;

a slot defined by said pair of alternately "L"-shaped members and inverse "L"-shaped members, said slot adaptedly dimensioned for slidingly receiving said "T"-shaped protuberances and having a first and second slot ends; and said tire mounted to said outer rim such that said "T"-shaped protuberances mate in said slots.

20. The tire mounting system of claim 19 wherein said "L"-shaped and inverse "L"-shaped members extend substantially normal to said outer rim.

21. The tire mounting system of claim 20 wherein said distance said pair of alternately "L"-shaped and inverse "L"-shaped members extend axially is substantially equal to the sidewall width such that said first and second slot ends abut said first and second inner sidewall surfaces, respectively.

22. The tire mounting system of claim 19 further comprising:

a hub encircled by said inner rim; and a plurality of inner spokes radially extending from and attaching said hub to said inner rim.

23. The tire mounting system of claim 19 wherein said plurality of outer spokes are formed of material having elastic properties which absorbs shock.

24. The tire mounting system of claim 23 wherein said material is polyethylene.

25. The assembly of claim 7 further comprising a hub cap.

26. The tire mounting system of claim 19 further comprising a hub cap.

27. A wheel for mounting a tire, the tire having a first and second inner sidewall surface, a tread surface, a rim surface from which a plurality of protuberances radially extend, each protuberance having a respective form, and a sidewall width defined between the first and second inner sidewall surfaces; the wheel comprising:

a rim having a mounting surface; and a plurality of members extending in a radial direction from said mounting surface, each said members having an rotational width, each said members having a respective first and second end; said members being configured to define at least one attachment means adapted for attaching said rim to the tire and being provided in a form having a complementary mating-type correspondence with the form of a respective one of said plurality of protuberances, each said attachment means having an attachment means rotational width, the rotational width of each said member being no greater than the rotational width of the respective attachment means associated therewith.

28. The wheel of claim 27 wherein said plurality of members extend substantially normal to said rim.

29. The wheel of claim 27 wherein each said members extends in an axial direction a distance no greater than the sidewall width.

30. The wheel of claim 27 wherein each said attachment means comprises a slot.

31. A tire mounting system, the system comprising:

a tire having a first and second inner sidewall surface, a tread surface, and a rim surface;

a sidewall width defined between said first and second inner sidewall surfaces;

a plurality of protuberances extending radially from said rim surface of said tire, each protuberance having a respective form;

a rim having a mounting surface;

a plurality of members extending in a radial direction from said mounting surface, each said members having an annular width, each said members having a respective first and second end; said members being configured to define at least one attachment means adapted for attaching said tire to said rim and being provided in a form having a complementary mating-type correspondence with the form of a respective one of said plurality of protuberances, each said attachment means having an attachment means annular width, the annular width of each said member being no greater than the annular width of the respective attachment means associated therewith;

said tire mounted to said rim such that said protuberances mate with said attachment means.

32. The tire mounting system of claim 31 wherein said plurality of members extend substantially normal to said rim.

33. The tire mounting system of claim 31 wherein each said members extends in an axial direction a distance no greater than the sidewall width.

34. The wheel of claim 31 wherein each said attachment means comprises a slot.

35. A wheel article for use in mounting a tire, said article comprising:

a first rim having a mounting surface; and at least one pair of associated alternately "L"-shaped and inverse "L"-shaped members cooperatively defining a slot therebetween, and extending in a radial direction from said mounting surface, and extending in an axial direction along said mounting surface.

36. A wheel article for use in mounting a tire, said article comprising:

a first rim having a mounting surface; and at least one pair of associated alternately "L"-shaped and inverse "L"-shaped members cooperatively defining a slot therebetween, and extending in a radial direction from said mounting surface, and extending in an axial direction along said mounting surface, each tire attachment feature defining a respective "T"-shaped projection, the slot of each respective pair of associated alternately "L"-shaped and inverse "L"-shaped members being adapted for matability with the "T"-shaped projection of a respective tire attachment feature.

37. A wheel article for use in mounting a tire, said article comprising:

a first rim having a mounting surface; and at least one pair of associated alternately "L"-shaped and inverse "L"-shaped members cooperatively defining a slot therebetween, and extending in a radial direction from said mounting surface, and extending in an axial direction along said mounting surface, the slot of each respective pair of associated alternately "L"-shaped and inverse "L"-shaped members having a respective axial dimension substantially equal to a sidewall separation measure pertaining to a tire usable with said wheel article.

38. The article as recited in claim 35, further comprising:

a hub encircled by said first rim; and a connection means to connect said hub with said first rim.

39. A wheel article for use in mounting a tire, said article comprising:

a first rim having a mounting surface; and at least one pair of associated alternately "L"-shaped and inverse "L"-shaped members cooperatively defining a slot therebetween, and extending in a radial direction from said mounting surface, and extending in an axial direction along said mounting surface;

a hub encircled by said first rim;

a connection means to connect said hub with said first rim; and said connection means including a plurality of spokes being formed of material having elastic properties capable of absorbing shock.

40. A wheel article for use in mounting a tire, said article comprising:

a first rim having a mounting surface; and at least one pair of associated alternately "L"-shaped and inverse "L"-shaped members cooperatively defining a slot therebetween, and extending in a radial direction from said mounting surface, and extending in an axial direction along said mounting surface; and a second rim disposed inwardly of and substantially concentric with said first rim; and a means to connect said first rim to said second rim.

41. The article as recited in claim 40, wherein said connection means includes a plurality of spokes being formed of material having elastic properties capable of absorbing shock.

42. The article as recited in claim 40, further comprising:

a hub encircled by said second rim; and a means to connect said hub with said second rim.

43. A wheel article for use in mounting a tire, said tire including at least one tire attachment feature, each tire attachment feature having a respective attachment feature form, said article comprising:

a rim having a mounting surface; and a plurality of members extending from said mounting surface, said members being configured to define a plurality of attachment means disposed annularly in spaced-apart relationship about said mounting surface said plurality of members comprising at least one pair of associated alternately "L"-shaped and inverse "L"-shaped elements cooperatively defining a slot therebetween;

each attachment means being adapted for use in attaching said wheel article to a tire usable with said wheel article, each attachment means having an attachment means form exhibiting a complementary mating-type correspondence with the respective attachment feature form of the respective tire attachment feature.

44. The article as recited in claim 43, wherein each tire attachment feature defining a "T"-shaped projection, the slot of each respective pair of associated alternately "L"-shaped and inverse "L"-shaped elements being adapted for matability with the "T"-shaped projection of a respective tire attachment feature.

45. The article as recited in claim 43, wherein each attachment means further comprises a respective slot.

46. The article as recited in claim 45, wherein the slot of each respective attachment means being suitable to receive the respective tire attachment feature associated therewith.

47. The article as recited in claim 43, wherein each tire attachment feature defining a radially extending projection element, each attachment means being adapted for matability with the projection element of a respective tire attachment feature.

48. A wheel article for use in mounting a tire, said tire including at least one tire attachment feature each having a respective form each tire attachment feature defining a "T"-shaped projection, said article comprising:

a rim having a mounting surface; and at least one attachment means extending from said mounting surface, each attachment means being adapted for use in attaching said wheel article to a tire usable with said wheel article each attachment means including a respective pair of associated alternately "L"-shaped and inverse "L"-shaped members cooperatively defining a slot therebetween;

each attachment means having a form exhibiting a complementary mating-type relationship with the form of a respective tire attachment feature, the slot of each respective pair of associated alternately "L"-shaped and inverse "L"-shaped members of a corresponding attachment means being adapted for matability with the "T"-shaped projection of a respective tire attachment feature.

49. The article as recited in claim 48, wherein the slot of each respective attachment means being suitable to receive the respective tire attachment feature associated therewith.

50. The article as recited in claim 48, wherein each tire attachment feature defining a radially extending projection element, each attachment means being adapted for matability with the projection element of a respective tire attachment feature.

51. A wheel article for use in mounting a tire, said article comprising:

a rim having a mounting surface; and at least one attachment means extending from said mounting surface, each attachment means being adapted for use in attaching said wheel article to a tire usable with said wheel article;

each attachment means including a slot, each attachment means having an attachment means form exhibiting a complementary mating-type relationship with an attachment feature form of a respective attachment feature of a tire usable with said wheel article, each respective tire attachment feature defining a "T"-shaped projection, the slot of each respective attachment means being adapted for matability with the "T"-shaped projection of a respective tire attachment feature.

52. The article as recited in claim 51, wherein each attachment means includes a respective pair of associated alternately "L"-shaped and inverse "L"-shaped members configured to define therebetween the slot of the respective attachment means.

53. A tire article for use in mounting to a wheel, said article comprising:

a first and second inner sidewall surfaces;

a tread surface;

a rim surface; and a plurality of projection elements extending radially from said rim surface, at least one said projection element defining a "T"-shaped form.

54. The article as recited in claim 53, wherein each projection element defines a "T"-shaped form.

55. The article as recited in claim 53, wherein each projection element having a form exhibiting a complementary mating-type correspondence with the form of a respective wheel attachment feature of a wheel usable with said tire article.

56. The article as recited in claim 55, wherein each wheel attachment feature of a wheel usable with said tire article defining a respective slot, each projection element being adapted for matability with the slot of a respective wheel attachment feature.

* * * * *